(12) United States Patent
Sugumaar et al.

(10) Patent No.: US 12,068,772 B2
(45) Date of Patent: Aug. 20, 2024

(54) PROTECTIVE COVER FOR A 5G WIRELESS TELECOMMUNICATIONS DEVICE AND METHODS FOR REDUCING SIGNAL ATTENUATION USING THE SAME

(71) Applicant: Design Blue Limited, London (GB)

(72) Inventors: Piriya Sugumaar, London (GB); Richard Holman, London (GB)

(73) Assignee: Design Blue Limited, Croydon (GB)

( * ) Notice: Subject to any disclaimer, the term of this patent is extended or adjusted under 35 U.S.C. 154(b) by 987 days.

(21) Appl. No.: 17/016,649

(22) Filed: Sep. 10, 2020

(65) Prior Publication Data
US 2021/0083708 A1  Mar. 18, 2021

(30) Foreign Application Priority Data

Sep. 12, 2019 (GB) .................................. 1913192

(51) Int. Cl.
| | |
|---|---|
| C08K 7/22 | (2006.01) |
| A45C 11/00 | (2006.01) |
| C08K 7/28 | (2006.01) |
| C08L 33/08 | (2006.01) |
| C08L 53/00 | (2006.01) |
| C08L 75/08 | (2006.01) |
| H01Q 1/00 | (2006.01) |
| H01Q 1/52 | (2006.01) |
| H04B 1/3827 | (2015.01) |
| H04B 1/3888 | (2015.01) |

(52) U.S. Cl.
CPC ............ *H04B 1/3838* (2013.01); *A45C 11/00* (2013.01); *C08K 7/22* (2013.01); *C08K 7/28* (2013.01); *C08L 33/08* (2013.01); *C08L 53/00* (2013.01); *C08L 75/08* (2013.01); *H01Q 1/005* (2013.01); *H01Q 1/526* (2013.01); *H04B 1/3888* (2013.01); *A45C 2011/002* (2013.01); *C08K 2201/00* (2013.01); *C08K 2201/003* (2013.01); *C08K 2201/005* (2013.01)

(58) Field of Classification Search
CPC ..... H04B 1/3838; H04B 1/3888; A45C 11/00; A45C 2011/002; C08K 7/22; C08K 7/28; C08K 2201/00; C08K 2201/003; C08K 2201/005; C08L 33/08; C08L 53/00; C08L 75/08; H01Q 1/005; H01Q 1/526; H01Q 1/42; H01Q 1/40; H01Q 15/00; H01Q 17/00
USPC ........................................................ 523/219
See application file for complete search history.

(56) References Cited

U.S. PATENT DOCUMENTS

| | | | | |
|---|---|---|---|---|
| 2009/0105396 | A1* | 4/2009 | Fujihara | C08L 53/00 524/505 |
| 2012/0121876 | A1* | 5/2012 | Milesi | C08L 53/025 524/505 |
| 2015/0030824 | A1 | 1/2015 | Crosley | |
| 2018/0030270 | A1* | 2/2018 | Yalcin | C08L 51/06 |
| 2018/0167148 | A1* | 6/2018 | Vannucci | H04L 25/0278 |

FOREIGN PATENT DOCUMENTS

| | | |
|---|---|---|
| CN | 104086883 A | 10/2014 |
| CN | 107189242 A | 9/2017 |
| CN | 107216558 A | 9/2017 |
| CN | 109836631 A | 6/2019 |
| JP | 2003012852 A | 1/2003 |
| WO | 9801478 A1 | 1/1998 |
| WO | 9905099 A1 | 2/1999 |
| WO | 9931144 A1 | 6/1999 |
| WO | 2010072812 A1 | 7/2010 |
| WO | 2017203467 A1 | 11/2017 |
| WO | 2019130269 A1 | 7/2019 |

OTHER PUBLICATIONS

Machine English Translation of CN 104086683 (Year: 2014).*
Examination Report in the United Kingdom for Application No. GB1913192.9, dated Jun. 29, 2022.
Dombrovsky, L. et al., "Paint coatings containing hollow glass microspheres", Thermopedia, 2023, Article last modified: Sep. 20, 2011. https://www.thermopedia.com/content/172/.
Examination Report in Great Britain for Application No. GB1913192. 9, dated Mar. 10, 2023.
Gulyaev, I., "Experience in plasma production of hollow ceramic microspheres with required wall thickness", Ceramics International, vol. 41, Issue 1, Part A, Jan. 2015, pp. 101-107.
"Hollow Glass Microspheres", BariteWorld, 2015, BariteWorld. com, Available from: https://bariteworld.com/industrial-minerals-products/hollow-glass-microspheres/ Archived version accessed [Sep. 1, 2023].
Karasu, B. et al., "Glass microspheres," El-Cezeri Journal of Science and Engineering, Sep. 30, 2019, vol. 6, No. 3, pp. 613-641.
GB Search Reportdated Jan. 28, 2020 for App. No. GB1913192.9.

* cited by examiner

*Primary Examiner* — Hannah J Pak
(74) *Attorney, Agent, or Firm* — Ryan T. Grace; Advent, LLP

(57) ABSTRACT

The present invention relates to a protective cover for a 5G wireless telecommunications device and, in particular, its use in a method of reducing signal attenuation experienced by a 5G wireless communications device.

10 Claims, No Drawings

PROTECTIVE COVER FOR A 5G WIRELESS TELECOMMUNICATIONS DEVICE AND METHODS FOR REDUCING SIGNAL ATTENUATION USING THE SAME

The present invention relates to a protective cover for a 5G wireless telecommunications device and, in particular, its use in a method of reducing signal attenuation experienced by a 5G wireless communications device. Specifically, the protective cover is formed from a thermoplastic resin composition through which hollow microspheres are dispersed.

The next generation of wireless access technology is set to be the $5^{th}$ generation ("5G") of mobile communication which will follow the wireless industry's coordinated efforts to research, develop and implement common industry specifications and technical standards which define a new complete mobile communication system. Bands at different frequencies have different characteristics, particularly with respect to propagation properties. The 5G network has been developed to accommodate extreme data rates and very high traffic capacity demands which has required high-frequency bands to be assigned to the network.

One challenge presented by the increased reliance on higher frequency bands is that these are affected by signal attenuation more so than lower frequency bands, for instance as a result of greater interference from surrounding materials and greater dielectric losses. In the case of a wireless telecommunications device configured for operation with the a network having higher frequency bands such as the 5G network, such signal attenuation can be exacerbated by materials encasing or in proximity of the antennae of the device, including protective covers and casings housing the device itself. Thus, in the case of an impact protective cover for a wireless telecommunications device configured for use with the 5G network, there is a dual challenge of meeting the need for adequate impact protection, whilst minimising interference to ensure optimum performance of the device.

Interference may be reduced by ensuring that materials in proximity of the device have as low a dielectric constant as possible, so as to lower the incidence of electromagnetic energy absorption, from which interference and signal attenuation may derive. WO 2017/203467 describes the use of a low dielectric glass fiber component to lower the dielectric performance of a thermoplastic to which it is added. However, impact modifier is relied upon in the exemplified compositions of this disclosure in order to compensate for a lowering of the impact strength of the thermoplastic following addition of a glass fiber component. WO 2017/203467 indicates that impact modifier may be present in an amount of up to 20 wt. % of the resin composition.

The present invention is based on the surprising discovery of a means for lowering the dielectric constant (Dk)/permittivity ($\varepsilon$) associated with a thermoplastic elastomer protective cover for a wireless telecommunications device, without sacrificing impact strength or the ability of the protective cover to adequately protect the device. In particular, the present invention is based, at least in part, on the use of hollow microspheres, dispersed through the thermoplastic elastomer composition of a protective cover, for lowering the dielectric constant (Dk)/permittivity ($\varepsilon$) and thereby reducing electromagnetic radiation absorption and interference by the protective cover.

The use of the hollow microspheres has meant that desirable dielectric properties of the protective cover may be realised yet without sacrificing the impact strength of the cover itself. The addition of hollow microspheres, such as hollow glass microspheres, would normally be expected to deteriorate impact strength performance, as is known in the case of glass fiber reinforced polymer compositions, where impact modifiers, compatibilizers or surface treatments are typically required in order to mitigate such losses. However, it has been surprisingly been found that, where the base polymer composition is a thermoplastic elastomer resin composition, the hollow microspheres can be present in an amount to lower dielectric constant (Dk)/permittivity ($\varepsilon$) appreciably, with little or no material detriment to impact strength.

Accordingly, in a first aspect, the present invention provides a method of reducing signal attenuation by an impact protective cover for a 5G wireless communications device, said method comprising providing a protective cover, the cover being formed from a thermoplastic elastomer resin composition having hollow microspheres dispersed therein.

In another aspect, the present invention provides a 5G wireless telecommunications device impact protective cover, said protective cover comprising a thermoplastic elastomer having hollow glass microspheres dispersed therein.

In still another aspect, the present invention provides use of hollow microspheres for reducing signal attenuation properties of a protective cover for a wireless communications device adapted for use with a 5G communications network by incorporating the hollow microspheres into a thermoplastic elastomer resin composition from which the protective cover is formed.

In yet a further aspect, the present invention provides use of a thermoplastic elastomer material having hollow microspheres dispersed therein for reducing signal attenuation caused by a protective cover for a wireless communications device adapted for use with a 5G communications network.

Historically, the bands for first and second generation of mobile networks ("1G" and "2G") were primarily assigned frequencies of around 800 to 900 MHz, in addition to a number of minor bands at higher and lower frequencies. The higher-frequency bands assigned to the 5G network are generally above 24 GHz, primarily falling in the ranges of 24.35 to 29.5 GHz and 37 to 40 GHz, which are significantly higher than the highest frequency bands of existing third and fourth generation ("3G" and "4G") networks with bands in the 2 to 3 GHz range. The present invention has been found to have particular application in overcoming problems with signal interference associated with existing impact protective covers that are not specifically adapted for protecting 5G wireless communications devices which are intended to operate specifically with the high frequency bands of the 5G network that are more susceptible to signal interference.

Thus, the present invention is considered to be particularly useful where users upgrade to, or at least partially rely on, the 5G network for communication purposes and wish to maintain the same performance in terms of impact protection conferred to the wireless communications device, without compromising the performance of the device.

The method of the present invention reduces signal attenuation by an impact protective cover for a 5G wireless communications device by providing a protective cover formed from a thermoplastic elastomer resin composition having hollow microspheres dispersed therein.

Reference herein to "5G" or "5G network" is intended to refer to the $5^{th}$ generation multi-band wireless communications network characterised in having a high frequency band above 24 GHz (for example, a band or bands in the ranges of 24.35 to 29.5 GHz and 37 to 40 GHz). Reference to a "5G wireless communications device" refers to a device capable of operation on the 5G network, including for instance, a mobile telephone.

Surprisingly, the addition of hollow microspheres in amounts effective to reduce the dielectric constant (Dk)/permittivity (ε) of the composition and signal attenuation properties, particularly with respect to high frequency bands (e.g. above 24 GHz), has been found to be achievable without a corresponding loss of impact protection strength, as would normally be expected. The particular combination of a thermoplastic elastomer base polymer composition together with the hollow microspheres has thus been found to be particularly advantageous for use as a protective cover for a 5G wireless communications device. The thermoplastic elastomer resin composition for use in the present invention is not particularly limited, provided it has adequate impact resistance properties making it suitable for use as an impact protective cover for a wireless communications device, and is typically a block copolymer of thermoplastic block and elastomeric block components.

Block copolymers that contain at least two blocks that have relatively high glass transition temperature (e.g. above room temperature) separated by block(s) with a relatively low glass transition temperature ($T_g$) (e.g. below room temperature), exhibit elastomeric properties, the extent of which typically being determined by the size of the low $T_g$ block volume. There are two main ways to produce such multi-block copolymers, those that use: (i) non-living alkene polymerization catalysts, where changes at the site of enchainment during chain formation give rise to different blocks in the polymer; and (ii) living catalysts, where changes in the monomer or reaction conditions during chain formation result in controlled block formation In preferred embodiments, the thermoplastic elastomer is selected from a thermoplastic polyurethane polymer, an acrylic-based polymer and a polyolefin multiblock copolymer. For example, wherein the thermoplastic polyurethane polymer is an aromatic ether based polyurethane polymer, the acrylic-based polymer is a (meth)acrylate di- or tri-block copolymer and/or the polyolefin multiblock copolymer is a polystyrene-polyolefin multiblock copolymer.

Thermoplastic Polyurethane (TPU) Polymer

The thermoplastic polyurethane (TPU) polymer that may be used in accordance with present invention is a thermoplastic elastomer that is preparable from di-functional isocyanates and di-functional hydroxyls (i.e. polyols), where the diisocyanates, and any optional chain extender portions that may be present, correspond to the hard segment of the polymer, having a relatively high glass transition temperature (Tg), whilst the polyols correspond to the soft segment, having a relatively low glass temperature (Tg).

Any form of TPU which is suitable for use as a protective cover may be used in connection with the present invention, including those which derive from polyols selected from polyesters, polyethers, polycarbonates, polycaprolactones, and other hydroxyl and amine terminated compounds. In preferred embodiments, the TPU used in the present invention is polyether based. Suitable polyether polyols for use in the present application typically have 2 to 4 carbon chains in their repeat units and examples include poly(tetramethylene ether) glycol (PTMEG) and polypropylene glycols (PPG).

The TPUs of use in connection with the present invention may be aliphatic or aromatic, the aromatic or aliphatic functionality deriving from the diisocyanate monomer used in preparation of the polymer. In preferred embodiments, the TPU used in connection with the invention is aromatic.

Examples of aromatic diisocyanates that may be used in preparing suitable thermoplastic polyurethanes include 3,3'-Dimethyl-4,4'-biphenylene diisocyanate include methylene diphenyl diisocyanate (MDI) and 2,4-toluene diisocyanate (TDI), 3,3'-Dimethyl-4,4'-biphenylene diisocyanate (TODI), p-Phenylene diisocyanate (PPDI), and 1,5-naphthalene diisocyanates (NDI). Examples of aliphatic diisocyanates that may be used in preparing suitable thermoplastic polyurethanes include methylene dicyclohexyl diisocyanate (MDI) or hydrogenated MDI (HMDI), isophorone diisocyanate (IPDI), hexamethylene diisocyanate (HDI).

In particularly preferred embodiments, the TPU is a polyether based aromatic polyurethane, a specific example of which is Estane® 58887 (available from Lubrizol).

Acrylic-Based Polymer

The acrylic-based polymer is suitably a (meth)acrylate di- or tri-block copolymer. The methacrylic ester monomer may be selected, for instance, from methyl methacrylate, ethyl methacrylate, n-butyl methacrylate, isobutyl methacrylate, tert-butyl methacrylate, 2-ethylhexyl methacrylate, dodecyl methacrylate, isobornyl methacrylate, cyclohexyl methacrylate, tridecyl methacrylate, stearyl methacrylate, benzyl methacrylate, 2-hydroxyethyl methacrylate, 2-hydroxypropyl methacrylate, 2-methoxyethyl methacrylate, dimethylaminoethyl methacrylate, diethylaminoethyl methacrylate, glycidyl methacrylate, and tetrahydrofurfuryl methacrylate.

In specific embodiments, the (meth)acrylate di- or tri-block copolymer may include blocks selected from poly (methyl methacrylate) ("PMMA"), poly(lauryl methacrylate) ("PLMA"), poly(n-butyl acrylate) ("PnBA"), and poly (2-ethylhexyl acrylate) ("PEHA"), and combinations thereof. Typically, the acrylic-based polymer comprises a hard polymer block having a relatively high glass transition temperature (Tg), such as PMMA and PLMA, and a soft polymer block having a relatively low glass transition temperature (Tg), typically below room temperature (25° C.), such as PnBA and PEHA.

Examples of preferred (meth)acrylate tri-block copolymers include poly(methyl methacrylate)-b-poly(lauryl methacrylate)-b-poly(methyl methacrylate) triblock copolymer, "PMMA-b-PLMA-b-PMMA", poly(methyl methacrylate)-b-poly(n-butyl acrylate)-b-poly(methyl methacrylate) triblock copolymer, "PMMA-b-PnBA-b-PMMA" (for example, KURARITY® LA series, such as LA2250 and LA2270, available from Kuraray), poly(methyl methacrylate)-b-poly(2-ethylhexyl acrylate)-b-poly(methyl methacrylate) triblock copolymer, "PMMA-b-PEHA-b-PMMA" and poly(methyl methacrylate)-b-poly[(n-butyl-co-2-ethylhexyl acrylate]-b-poly(methyl methacrylate) triblock copolymer, "PMMA-b-P(nBA/2EHA)-b-PMMA" (for example, KURARITY® LK series available from Kuraray).

Examples of known methods for producing acrylic block copolymers in which the structures are controlled without using metal catalysts include reversible addition-fragmentation chain transfer (RAFT) polymerization. In comparison to free radical polymerisation, which gives broad polymer molecular weight distributions and uncertainty as to polymer structure, RAFT allows a high level of control such that certain polymer properties, such as molecular weight and polydispersity, can be tuned. Example methods for utilizing RAFT are disclosed in WO 98/01478; WO 99/05099; and WO 99/31144. According to these methods, it is possible to produce acrylic block copolymers in which the structures are controlled.

Polyolefin Multiblock Copolymer

As the skilled person is aware, polyolefin multiblock copolymers may be designed to have desirable elastomeric properties, in addition to the thermoplastic properties conferred by the polyolefin block, by the presence of a polymer block with relatively lower glass transition temperature (Tg). The number of polymer blocks is not particular limited, provided there are at least two blocks in order to confer the required thermoplastic and elastomeric properties. Preferably, the polyolefin multiblock copolymer is a triblock or a tetrablock polymer.

In preferred embodiments, the polyolefin multiblock copolymer is a polystyrene-polyolefin multiblock copolymer. Examples of suitable polystyrene-polyolefin multiblock copolymers include styrene-butadiene-styrene (SBS) block copolymer, styrene-ethylene-butadiene-styrene (SEBS) block copolymer, styrene-isoprene-styrene (SIS) block copolymer, styrene-ethylene-ethylene-butylene-styrene (SEEPS) block copolymer, and styrene-ethylene-propylene-styrene (SEPS) block copolymer.

Hollow Microspheres

The present invention utilizes hollow microspheres as a means for lowering the dielectric constant (Dk)/permittivity ($\varepsilon$) associated with a thermoplastic elastomer composition, in order to reduce absorption of electromagnetic radiation thereby reducing signal attenuation by interference from the impact protective cover. The use of the hollow microspheres has meant that desirable dielectric properties of the protective cover may be realised, in particular those where capacity for attenuation of the 5G network signal is minimised. Moreover, whilst it would be expected that this would lead to a material loss of impact strength in the cover itself, this has surprisingly not been found to be the case where the protective cover is formed from a thermoplastic elastomer composition as described above.

Reference to "hollow microspheres" herein refers to spherical particles (also known as "microbubbles" and "microballoons") having an average diameter in the micrometer range which are hollow, i.e. having an internal space or void encapsulated by the wall or shell or the microsphere.

The composition of the hollow microspheres which are of use in the present invention is not particularly limited, since it has been found that a variety of different composition classes can be used to lower the dielectric constant/permittivity ($\varepsilon$) associated with the thermoplastic elastomer composition in which they are dispersed. It has been found by the inventors that the dielectric constant (Dk)/permittivity ($\varepsilon$) of the impact protective cover decreases with increasing volume/weight fraction of the microspheres in the thermoplastic elastomer composition. This is believed to be a result of the presence of the internal space in each of the hollow microspheres, which correspond to voids in the polymer composition through which they are dispersed.

The volume of the internal space of the microsphere, thickness of the microsphere walls and weight fraction/volume fraction of the microspheres in the thermoplastic elastomer composition are therefore believed to have a greater bearing on reducing the dielectric constant (Dk)/permittivity ($\varepsilon$) of the thermoplastic elastomer composition than the composition of the hollow microspheres themselves. Furthermore, the skilled person is able to select an appropriate method of processing of the thermoplastic elastomer composition based on the particular composition of the hollow microspheres and the physical properties of the microspheres (in particular, crush strength and density).

The average diameter of the hollow microspheres for use in the present invention is not particularly limited, provided that the microspheres are present in the composition to such an extent that they are capable of reducing the dielectric constant (Dk)/permittivity ($\varepsilon$) of the thermoplastic elastomer composition. The average diameter of the hollow microspheres is suitably from 1 to 600 microns, preferably 2 to 200 microns, more preferably 10 to 100 microns, still more preferably from 15 to 50, most preferably from 15 to 30 microns. The average diameter is determined using either a weight or number distribution of the hollow microspheres in a representative sample. The microsphere diameter and size distribution of a sample may be evaluated using scanning electron microscopy (SEM) (including both compositional and topographical modes).

The particle size distribution of the microspheres may be unimodal or multimodal (e.g. bimodal). Having a multimodal size distribution may have advantages in terms of processing of the thermoplastic elastomer resin composition (e.g. extrusion and moulding to form the protective article) and may provide opportunity to tune the physical properties (e.g. tensile strength, tensile modulus, flexural strength and flexural modulus) of the protective cover. Nevertheless, in preferred embodiments, the particle size distribution is unimodal.

Decrease in wall thickness of the hollow microspheres increases the internal space/void inside the hollow microspheres increases the air void size in HGMs. This can have an impact on crush strength of the hollow microspheres, and therefore the physical properties of the protective impact cover in which they are dispersed. It is also believed that increasing the internal space/void volume by reducing wall thickness may achieve some further reduction in dielectric constant (Dk)/permittivity ($\varepsilon$). However, this is balanced by a potential reduction in other desirable properties of the impact protective cover and the skilled person is able to select an appropriate wall thickness having regard to the balance of properties that are desired in the impact protective cover. A suitable range of wall thickness is from 2 to 20% of the diameter of the microsphere, preferably from 3 to 15%, more preferably from 5 to 10% of the diameter of the microsphere.

The hollow microspheres may have a broad range of densities, for example from 0.05 g/c$^3$ to as high as 0.80 g/c$^3$. Lower densities for the hollow microspheres may be preferred in order not to impact desired physical properties of thermoplastic elastomer cover (for example, it may be desirable to keep the cover as light weight as possible). In preferred embodiments, the density of the hollow microspheres is from 0.20 g/c$^3$ to 0.60 g/c$^3$, more preferably f from 0.30 g/c$^3$ to 0.50 g/c$^3$.

The hollow microspheres typically have a crush strength which is at least sufficient for the majority of the hollow spheres (e.g. at least 75 wt. %, more preferably at least 90 wt. %, of the hollow microspheres in the resin composition) to survive processing of the thermoplastic elastomer resin composition to form the protective cover (e.g. compounding, extrusion and moulding steps). The particular crush strength of the hollow microspheres will therefore depend on the particular features of the processing used in preparation of the protective cover, with higher stresses and forces associated with processing favouring the use of hollow microspheres having higher crush strengths. Preferably, the (bulk) isostatic crush strength (90% survival) of the hollow microspheres is at least 2,000 psi (137.9 bar), more preferably at least 5,000 psi (344.7 bar), still more preferably at least 10,000 psi (689.5 bar), yet more preferably at least 15,000 psi (1034 bar). A suitable method for determining (bulk) isostatic crush strength involves measuring the extent of crushing/survival of the hollow spheres, for instance by scanning electron microscope analysis, in a sample of microspheres subjected to an isostactic compressive force between two plates.

As discussed above, the composition of the hollow microspheres is not particularly limited. Suitable materials for the composition of the microspheres includes glass, ceramic, clay or polymer. Microspheres composed of these materials are readily available commercially and methods for their preparation are well known.

Hollow glass microspheres are readily available and particularly preferred for use in the present invention. Such glass spheres are typically composed of soda-lime borosilicate glass. Specific commercially available examples include 3M's iM16K, S60HS, and iM30K glass bubbles.

Ceramic hollow microspheres include alumina silicates (also called "cenospheres"), which are a common ash by-product of coal fired powers stations and are commercially available (for instance, as "Fillite", DELASPHERES™ from Delamin and Envirospheres from Palmer Holland). Such ceramics tend to have higher density than corresponding glass spheres and typically have a lower (bulk) isostatic crush strength (90% survival) in the range of approximately 1500 to 3250 psi (103.4 to 224.1 bar).

Clay hollow microspheres that are commercially available include Halloysite, Bentonite Montmorillonite, Smectite, Cloisite hollow microspheres (available from Reade, BYK or Sigma Aldrich).

Polymer hollow microspheres may also be used in accordance with the present invention. Polymer hollow microspheres are typically composed of thermoplastic for example, polyethylene (PE), polystyrene (PS), polymethylmethacrylate (PMMA), and polyvinylbenzene (PVB). Polymer hollow microspheres can have certain advantages over other forms, including greater durability as a result of a greater capacity for deformation before breaking.

Hollow microspheres having a surface treatment may also be utilised in connection with the present invention. Such surface treatments can be used to improve tensile and flex strength, for instance, and include aminosilane and zinc oxide treatments. Surface treatments may also be applied to the microspheres in order to aid their dispersion in the resin composition during preparation.

Optional Additives

Optional additives may be included in the thermoplastic elastomer compositions in order to fine-tune the properties of the impact protective cover, for example to improve abrasion-resistance, scratch resistance and/or dye-transfer resistance of the protective cover, or to aid in processing of the resin composition to produce the impact protective cover. A preferred class of optional additive is silicone gum, commercial examples of which include Genioplast Pellet S from Wacker or MB50-002 from Dow Corning.

Preparation

Typically, forming of the protective cover comprises dispersing the hollow glass spheres in the thermoplastic elastomer resin composition and moulding to form the protective cover. The thermoplastic elastomer resin compositions comprising hollow microspheres may be prepared by any suitable method which is capable of dispersing the microspheres throughout the composition. Thus, the step of providing the thermoplastic elastomer composition comprising hollow microspheres dispersed therein may comprise any necessary method steps for preparing the composition.

Hand blending of resin composition components or blending using, for instance, a Henschel-Mixer™ high speed mixer may be utilized, depending on the scale of the preparation. Preferably, melt processing techniques are used, including, for example, co-rotating and counter-rotating extruders, single screw extruders, twin screw extruders, co-kneaders, disc-pack processors and various other types of extrusion equipment. In preferred embodiments, the components of the composition may be compounded using a twin-screw extruder, the screw profile of which providing an effective means for dispersing the hollow microspheres throughout the resin composition. Distributive mixing elements, such as gear mixers, may also be used to aid dispersion. Preferably, the extruder is also equipped with a downstream feed-port for introducing the hollow microspheres to the polymer melt, instead of through a feed-port where solid polymer is typically introduced. An auger-driven side feeder may be advantageously utilized at a downstream port for this purpose, instead of an open hopper, for instance.

Thus, molten thermoplastic elastomer composition may first be generated and hollow microspheres subsequently fed into the extruder. The hollow microspheres are preferably fed into the extruder with an automated feeder, the feeder preferably supplied with a vacuum feed system with a pre-hopper. Volumetric and gravimetric feeders may also be used for precise metering of components.

The temperature of the melt in the preparation process is preferably kept to a minimum to maximise energy efficiency and avoid degradation of resin components. Suitable temperatures at which the thermoplastic elastomer resin compositions may be processed are from 80° C. to 300° C., preferably from 150° C. to 250° C., ideally with lower residence times where higher temperatures are used.

Once compounding/mixing of the thermoplastic elastomer compositions has been undertaken, the resulting compositions comprising hollow microspheres may optionally be pelletized, before moulding to form the protective cover. Suitably, any of the conventional moulding methods can be employed to mould the composition of the invention. Illustrative of such moulding methods are injection moulding, injection stretch moulding, extrusion moulding, and vacuum moulding. However, certain moulding techniques are preferred for minimising the potential for breakage of the hollow microspheres following dispersion in the resin. In particular, injection moulding is preferably used in the preparation of the protective cover. As the skilled person will appreciate, reducing injection speeds in injection moulding can minimise damage or breakage of the hollow microspheres and the pressure used to inject the resin into the mould is preferably below 25,000 PSI (1.72 kbar), as may for instance be determined based on the hydraulic pressure multiplied by the particular operating machine's intensification ratio. Hydraulic pressure may be readily reduced by increasing the melt temperature of the resin.

Impact Protective Cover

In an aspect, the present invention provides a 5G wireless telecommunications device impact protective cover, said protective cover comprising a thermoplastic elastomer having hollow glass microspheres dispersed therein, as described hereinbefore.

The impact protective cover may be shaped according to any particular design which is suitable for securing the cover to the wireless communications device and conferring adequate impact protection thereto. The dimensions of the impact protective cover are therefore largely dictated by the dimensions of the wireless communications device the cover is intended to be used with. The cover may therefore include folded edges, recesses, holes, protrusions, and appendages as necessary.

A particular advantage of the present invention is that the use of hollow microspheres is capable of reducing the dielectric constant (Dk)/permittivity ($\varepsilon$) of the protective cover so as to reduce signal attenuation induced by an impact protective cover which is employed in connection with a 5G wireless telecommunications device. Surprisingly, as is shown in the examples hereinbelow, this is achievable without any material loss of impact strength in the protective cover.

In preferred embodiments, the protective cover of the invention has a tensile strength of from 2.0 to 8.0 MPa, as measured by ASTM D412.

In preferred embodiments, the protective cover of the invention has a tensile modulus of from 5.0 to 20 MPa, as measured by ASTM D412.

In preferred embodiments, the protective cover of the invention has a flexural strength of from 1.0 to 5.0 MPa, as measured by ASTM D790.

In preferred embodiments, the protective cover of the invention has a flexural modulus of from 30 to 150 MPa, as measured by ASTM D790.

In preferred embodiments, the protective cover of the invention has a dielectric constant which is less than 2.90 at a frequency of 1.8 GHz.

In preferred embodiments, the protective cover of the invention has a dielectric constant which is less than 2.70 at a frequency of 10.2 GHz.

In preferred embodiments, the protective cover of the invention has a dielectric constant which is less than 2.50 at a frequency of 28 GHz and 39 GHz.

In preferred embodiments, the protective cover of the invention has a power attenuation which is less than 45 dB/m at a frequency of 1.8 GHz.

In preferred embodiments, the protective cover of the invention has a power attenuation which is less than 145 dB/m at a frequency of 10.2 GHz.

In still another aspect, the present invention provides use of hollow microspheres as described hereinbefore for reducing signal interference properties of a protective cover for a wireless communications device adapted for use with a 5G communications network by incorporating the hollow microspheres into a thermoplastic elastomer resin composition from which the protective cover is formed.

In yet a further aspect, the present invention provides use of a thermoplastic elastomer having hollow microspheres dispersed therein as described herein for reducing signal attenuation caused by a protective cover for a wireless communications device adapted for use with a 5G communications network.

The present invention will now be described with reference to the following non-limiting examples.

EXAMPLES

Example 1

Thermoplastic elastomer resin blends were prepared having the compositions specified in Table 1 below, each blend comprising various amounts of poly(methyl methacrylate)-b-poly(n-butyl acrylate)-b-poly(methyl methacrylate) triblock copolymer, PMMA-b-PnBA-b-PMMA, (KURARITY® LA2250 from Kuraray), additional acrylic based thermoplastic elastomer, hollow glass microspheres (3M Glass Bubbles iM16K, having an average diameter of 20 microns) and an optional silicone gum based additive (MB50-002 from Dow Corning).

TABLE 1

|  | Blend 1 | Blend 2 | Blend 3 | Blend 4 |
| --- | --- | --- | --- | --- |
| PMMA-b-PnBA-b-PMMA | 45 | 40 | 38.5 | 43.5 |
| Other acrylic based polymer | 45 | 40 | 38.5 | 43.5 |
| Hollow Glass Microspheres | 10 | 20 | 20 | 10 |
| Silicone gum 1 | — | — | 3 | 3 |
| Total % | 100.00 | 100.00 | 100.00 | 100.00 |

The polymer resin for each of Blends 1 to 4 was weighed and 0.5% semtol oil was added to facilitate dispersion of the microspheres (by sticking to the pellets of thermoplastic elastomer). Semtol oil has a sufficiently low boiling point such that it may be subsequently removed from the composition by action of a vacuum pump. 10 Kg each of Blends 1 to 4 were subsequently compounded on a lab-line 24 mm twin-screw extruder before being pelletized to produce pellets.

Example 2

Thermoplastic elastomer resin blends were prepared having the compositions specified in Table 2 below, each blend comprising various amounts of a polyether based aromatic polyurethane (Estane® 58887, Lubrizol), hollow glass microspheres (3M Glass Bubbles iM16K, having an average diameter of 20 microns) and an optional silicone gum based additive (Genioplast Pellet S from Wacker).

TABLE 2

|  | Blend 5 | Blend 6 |
| --- | --- | --- |
| Estane 58887 | 90 | 87 |
| Hollow glass spheres | 10 | 10 |
| Silicone gum | — | 3 |
| Total % | 100.00 | 100.00 |

Blends 5 and 6 were mixed on a Banbury Internal Mixer with tangential rotors. The volume size of the mixer was 1.57 L, batch sizes were approximately 1.3 kg to as to fill the cavity. The resins of Blends 5 and 6 were added to the mixer and the speed of the rotators was set to 240 RPM for several minutes before the microspheres were added once the polymer was molten, at approximately 180° C. After mixing, the speed was dropped to 50 RPM for a several minutes, before the mixer was cooled to 137° C. The material was then in each case transferred to a granulator to yield pellets.

Example 3 (Comparative)

Thermoplastic elastomer resin blends were prepared having the compositions specified in Table 3 below, each blend comprising various amounts of: i) an acrylic based thermoplastic elastomer composition comprising poly(methyl methacrylate)-b-poly(n-butyl acrylate)-b-poly(methyl methacrylate) triblock copolymer, PMMA-b-PnBA-b-PMMA (KURARITY® LA2270 from Kuraray) in combination with an amorphous silica component; ii) an acrylic based thermoplastic elastomer corresponding to poly(methyl methacrylate)-b-poly(n-butyl acrylate)-b-poly(methyl methacrylate) triblock copolymer, PMMA-b-PnBA-b-PMMA, (KURARITY® LA2250 from Kuraray), iii) a further acrylic based thermoplastic elastomer; an optional synthetic, hydrophilic amorphous silica additive (HDK N20 from Wacker); iv) a polycarbonate thermoplastic polymer (SABIC Lexan® ML3290 PC); v) a polyester polyurethane elastomer (BASF Elastollan® C-85A); and/or vi) a polycarbonate thermoplastic polymer (Covestro Makrolon® 2805).

TABLE 3

|  | Blend 7 | Blend 8 | Blend 9 | Blend 10 | Blend 11 |
|---|---|---|---|---|---|
| PMMA-b-PnBA-b-PMMA (KURARITY ® LA2250) | — | 50 | | | |
| PMMA-b-PnBA-b-PMMA (KURARITY ® LA2270) + amorphous silica | 100 | — | | | |
| Other acrylic based polymer | — | 49 | | | |
| Amorphous silica additive | — | 1 | | | |
| Polycarbonate thermoplastic (SABIC Lexan ® ML3290 PC) | | | 100 | | |
| Polyester polyurethane elastomer (BASF Elastollan ® C-85A) | | | | 100 | |
| Polycarbonate thermoplastic (Covestro Makrolone ® 2805) | | | | | 100 |
| Total % | 100.00 | 100.00 | 100.00 | 100.00 | 100.00 |

Pellets of the polymer resins for each of Blends 7 to 11 were prepared substantially by the method of Example 1, except that the amorphous silica additive, where present, was dusted on to the pellets prior to compounding in the twin-screw extruder and no hollow glass spheres were added at any stage.

Example 4

The pellets formed from Blends 1 to 3, 5 to 8 and 10 of Examples 1 to 3 were injection moulded into 2 mm phone cover test pieces which were assessed for their impact strength based on a peak transmitted force test in which a corner of the test dummy impacted the 2 mm phone cover test pieces 3 times at sequentially greater drop heights onto an anvil. The transmitted force is measured by piezoelectric load cell beneath the anvil and average values recorded at each drop height. The lower the measured peak transmitted force, the greater the impact protection provided. The results of the peak transmitted force tests are show in Table 4 below.

TABLE 4

| Blend | PTF (kN) (1 m Drop Height) | PTF (kN) (1.6 m Drop Height) | PTF (kN) (3 m Drop Height) |
|---|---|---|---|
| 1 | 1.95 | 2.54 | 3.47 |
| 2 | 2.08 | 2.68 | 3.42 |
| 3 | 2.02 | 2.60 | 3.34 |
| 5 | 1.91 | 2.53 | 3.36 |
| 6 | 1.92 | 2.55 | 3.36 |
| 7 | 1.98 | 2.72 | 3.57 |
| 8 | 1.99 | 2.65 | 3.58 |
| 10 | 1.91 | 2.81 | 3.85 |

The results of Table 4 demonstrate that the presence of hollow microspheres has little or no effect on the impact strength of the test piece, as is particularly evident from the comparison of the results of Blends 1 to 3, 5 and 6 with comparative Blends 7 and 8, where very little difference in performance is noticeable. In fact, Blends 5 and 6, have lower peak transmitted force at each drop height than for all of the comparative examples indicating a minor improvement in impact strength.

Example 5

The pellets formed from Blends 1 to 11 from the above Examples were injection moulded into 1 and 2 mm plaques and their absolute permittivity (ε) tested using a Split-Post Dielectric Resonator (for 1.8 and 10.2 GHz frequencies) or using an MCK (Material Characterization Kit) machine, available for example from Swissto12® (for 50 GHz frequency), the results of which are shown in Table 5 below.

TABLE 5

| Blend | Permittivity (ε) (1.8 GHz, 2 mm) | Permittivity (ε) (10.2 GHz, 1 mm) | Permittivity (ε) (50 GHz, 2 mm) |
|---|---|---|---|
| 1 | 2.60 | 2.52 | — |
| 2 | 2.56 | 2.50 | — |
| 3 | 2.48 | 2.42 | — |
| 4 | 2.60 | 2.53 | 2.47 |
| 5 | 2.92 | 2.72 | — |
| 6 | 2.89 | 2.70 | 2.58 |
| 7 | 2.74 | 2.64 | 2.59 |
| 8 | 2.75 | 2.64 | — |
| 9 | 2.79 | 2.75 | 2.77 |
| 10 | 3.43 | 3.08 | 2.94 |
| 11 | 2.80 | 2.67 | 2.80 |

The lower the value of permittivity (ε), the lower the ability of the material to absorb electromagnetic energy and, as a result, the lower the propensity to attenuate an radiofrequency signal of a communications network. As can be seen above, increasing the proportion of hollow glass spheres in the composition across Blends 1, 2 and 3 (10%, 20% and 23% respectively) leads to a corresponding decrease in permittivity (ε). At much higher frequency (50 GHz), the TPU based inventive Blend 4 shows substantially lower permittivity (ε) (2.47) in comparison to comparative TPU based Blend 10 (2.94). This highlights the particular benefit of the invention in lowering absorption of electromagnetic energy of high frequency, including frequencies of an order which characterise the high frequency bands of the 5G network (i.e. above 24 GHz).

Example 6

Test pieces formed from Blends 1, 3 and 6 according to the invention from the above Examples were tested for tensile strength (ASTM D412), elongation at break (EAB) (ASTM D412), Young Modulus (ASTM D412), and Flex modulus (ASTM D790), averaged results of which are provided in Table 6 below.

TABLE 6

| | Tensile | | | Flex Modulus | |
| --- | --- | --- | --- | --- | --- |
| | | Elongation | | | |
| Blend | Maximum Tensile Stress (MPa) | at Break (EAB) (%) | Young Modulus (MPa) | Maximum Stress (MPa) | Flex Modulus (MPa) |
| 1 | 3.26 | 309 | 5.7 | 1.49 | 42.7 |
| 3 | 2.05 | 168 | 14.8 | 2.57 | 98.2 |
| 6 | 5.27 | 629 | 12.4 | 2.8 | 80.1 |

The invention claimed is:

1. A method of reducing signal attenuation by an impact protective cover for a 5G wireless communications device, said method comprising providing a protective cover, the cover being formed from a thermoplastic elastomer resin composition having hollow microspheres dispersed therein, wherein the hollow microspheres have a wall thickness of from 2 to 20% of the diameter of the hollow microspheres and are formed of glass, ceramic, clay or polymer, and the thermoplastic elastomer in the thermoplastic elastomer resin composition is selected from the group consisting of a thermoplastic polyurethane polymer, an acrylic-based polymer and a polyolefin multiblock copolymer, wherein the protective cover has a dielectric constant which is less than 2.90 at a frequency of 1.8 GHZ, a dielectric constant which is less than 2.70 at a frequency of 10.2 GHz or a dielectric constant which is less than 2.50 at a frequency of 28 GHz and 39 GHz.

2. The method according to claim 1, wherein the hollow microspheres are formed of glass and wherein the hollow glass microspheres are added to the thermoplastic elastomer resin composition in an amount of from 1 to 35% based on the weight of the thermoplastic elastomer resin composition.

3. The method according to claim 1, wherein the average diameter of the hollow microspheres is from 1 to 600 microns.

4. The method according to claim 1, wherein the hollow microspheres have a unimodal particle size distribution.

5. The method according to claim 1, wherein the hollow microspheres have a multimodal particle size distribution.

6. The method according to claim 1, wherein the thermoplastic polyurethane polymer is an aromatic ether based polyurethane, the acrylic-based polymer is a (meth)acrylate di- or tri-block copolymer and/or the polyolefin multiblock copolymer is a polystyrene-polyolefin multiblock copolymer.

7. The method according to claim 1, wherein the thermoplastic elastomer resin composition further includes silicone gum.

8. The method according to claim 1, wherein the hollow microspheres are formed of glass and wherein forming the protective cover comprises dispersing the hollow glass microspheres in the thermoplastic elastomer resin composition and moulding to form the protective cover.

9. The method according to claim 1, wherein the method further comprises the step of securing the protective cover to a 5G wireless communications device for protecting the device from impact.

10. The method according to claim 1, wherein the wireless communications device is a mobile telecommunication device.

* * * * *